March 27, 1956 A. J. BAYLISS 2,740,047

ELECTRIC PULSE GENERATORS

Filed Dec. 1, 1953 2 Sheets-Sheet 1

INVENTOR
Alan John Bayliss
BY
ATTORNEY

March 27, 1956 A. J. BAYLISS 2,740,047

ELECTRIC PULSE GENERATORS

Filed Dec. 1, 1953 2 Sheets-Sheet 2

INVENTOR
ALAN JOHN BAYLISS
BY
[signature]
ATTORNEY

United States Patent Office 2,740,047

Patented Mar. 27, 1956

2,740,047

ELECTRIC PULSE GENERATORS

Alan John Bayliss, Wembley, England, assignor to The General Electric Company Limited, London, England Application December 1, 1953, Serial No. 395,486

Claims priority, application Great Britain December 3, 1952

3 Claims. (Cl. 250—36)

Figure 1:
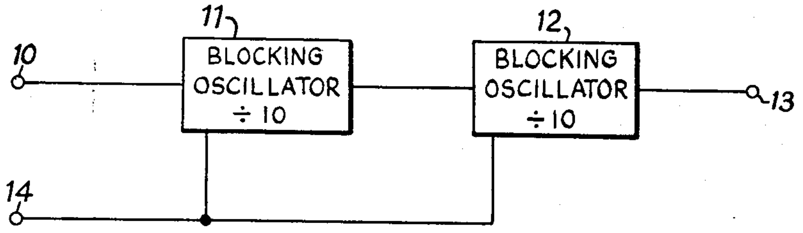

The present invention relates to electric pulse generators.

In the specification of patent application No. 395,391 filed December 1, 1953, by Peter William Ward and assigned to the assignee of the present application, there is described an automatic telephone exchange in which voltages received from one subscriber's line for transmission to another subscriber's line are applied to modulate electric pulses. The modulated pulses are transmitted through a time-sharing multiplex unit to the other subscriber's line terminating circuit where they are demodulated and the resulting speech voltages applied to the said other subscriber's line.

The number of subscribers' line circuits connected to the time-sharing multiplex unit is substantially greater than the number of channels provided by the multiplex unit and no channel is permanently allotted to any subscriber. Each subscriber's line circuit has its own pulse generator and when a connection is being established from one subscriber to another the instants of occurrence of the pulses generated by the calling subscriber's pulse generator are made to coincide with the recurring instants of a free channel in the multiplex unit.

For the purpose of indicating a free channel to the subscribers' line circuits means are provided to transmit from the multiplex unit to the subscribers' line circuits a recurring control pulse whose instants of occurrence coincide with the recurring instants of a free channel.

A pulse generator is required, therefore, capable of generating regularly-recurring pulses whose instants of occurrence can be made to coincide with the recurring instants of the channel indicated by the control pulse.

A further requirement is that when the phase of the pulses generated by the pulse generator has been adjusted in this way the phase should remain unaltered until a further control pulse is applied to the pulse generator.

The object of the present invention is to provide a pulse generator whereby the aforesaid requirements can be met.

According to the present invention an electric pulse generator suitable for generating regularly-recurring pulses of a frequency $f$ and of any one of $n$ different phases where $n$ is an integer greater than unity, includes a frequency-divider of frequency division ratio $n$:1, a source of regularly-recurring, operating pulses of predetermined amplitude and of a frequency $nf$ connected to the frequency-divider, the frequency-divider comprising an electron discharge valve having a feedback circuit between its anode and control grid responsive to an operating pulse from the said source to initiate a cycle of operation which renders the valve unresponsive to the next succeeding $n-1$ operating pulses of the said predetermined amplitude, and a phase-control circuit connected to the frequency-divider, the phase-control circuit being operable to apply to the frequency-divider a pulse coincident with any one of the pulses generated by the said source and at an amplitude larger than the said predetermined amplitude and sufficient to initiate a fresh one of the said cycles of operation, whereby the output of the frequency-divider is in the form of pulses of a recurrence frequency $f$ and of a phase determined by the instant of occurrence of the pulse applied to the frequency-divider from the control circuit. If pulses of a recurrence frequency $f/m$ are required at any one of $nm$ phases the output of the frequency divider may be applied to a further frequency-divider of the same kind and providing a frequency division ratio of $m$:1. The phase-control pulse is applied to both frequency-dividers simultaneously.

The frequency divider may conveniently be a blocking oscillator or a monostable multivibrator.

Figure 2:
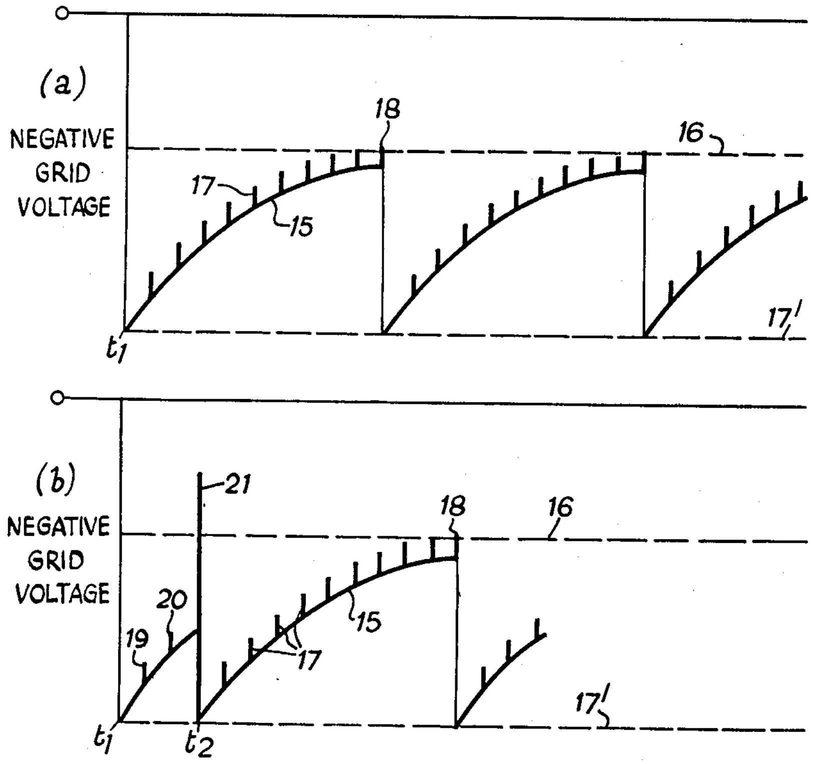
Figures 3, 4, 5:
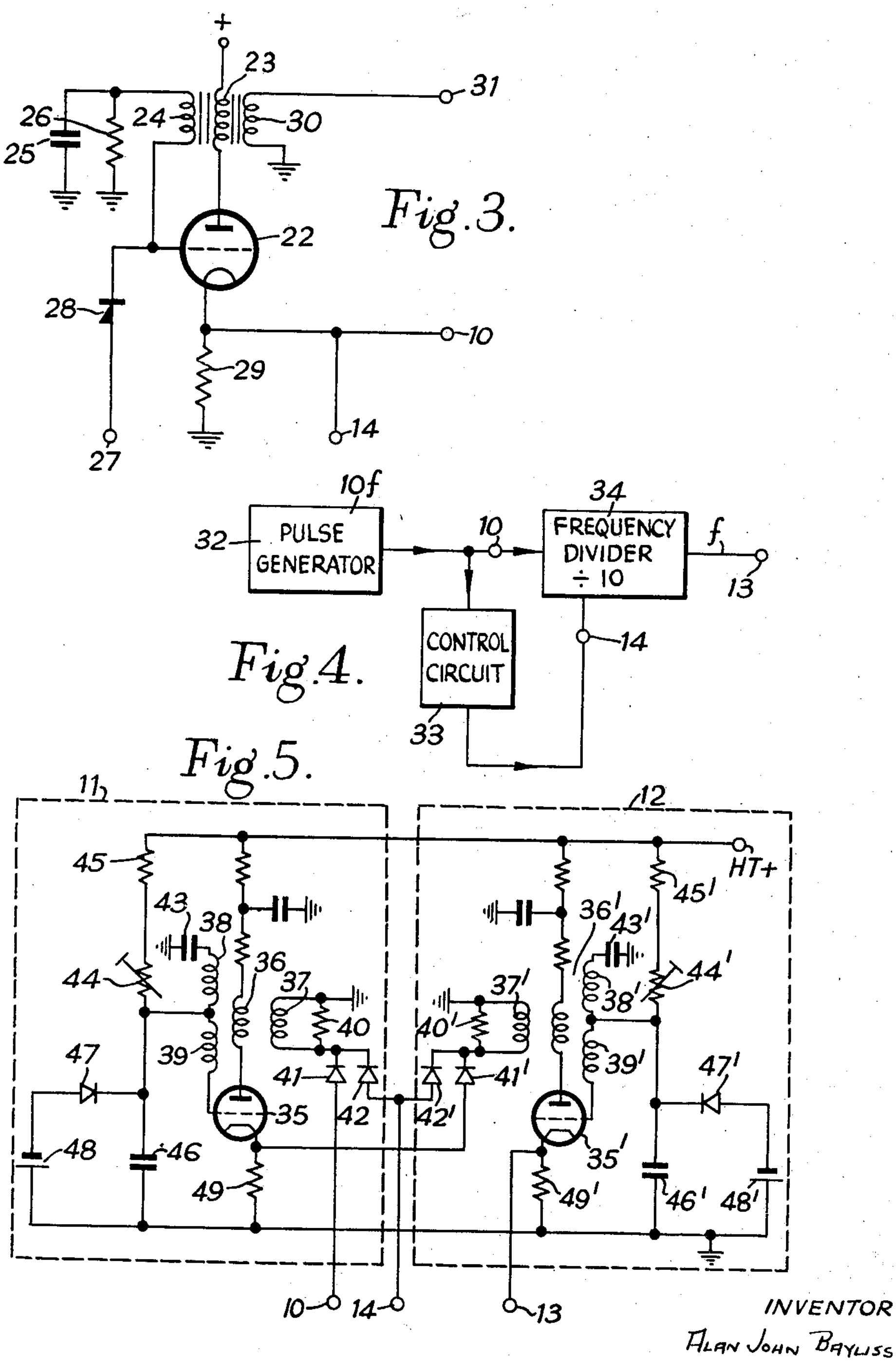

The invention will now be described by way of example with reference to the accompanying drawings, in which Fig. 1 is a block diagram of part of the embodiment, Fig. 2 is an explanatory diagram, Fig. 3 is a circuit diagram of a frequency-divider suitable for use in the arrangement of Fig. 1, Fig. 4 is a block schematic diagram of the embodiment, and Fig. 5 is a circuit diagram of further frequency-dividers suitable for use in the embodiment.

In Fig. 4 a pulse generator 32 is connected to the input terminal 10 of a frequency-divider 34 provided with an output terminal 13. The frequency divider 34 is arranged to have a frequency division ratio of 10:1 and the frequency of the pulses generated by the generator 32 is arranged to be 10$f$ whereby the frequency of the pulses appearing at the output terminal 13 is $f$.

The frequency-divider 34 may be in the form of a blocking-oscillator as shown in Fig. 3. The blocking oscillator comprises a triode valve 22 whose anode circuit includes a transformer 23 having a secondary winding 24. The lower terminal in the drawing of the transformer secondary winding 24 is connected to the control grid of the triode 22 and the upper terminal of the secondary winding 24 is connected to earth through a capacitor 25 shunted by a leak resistor 26. This circuit is arranged to provide regenerative feedback from the anode to the control grid of the triode 22. Negative bias is applied to the control grid of the triode 22 from a terminal 27 through a rectifier 28 poled as shown. A resistor 29 is connected in the cathode lead of the triode and the input terminal 10 is connected direct to the cathode of the triode. A further secondary winding 30 is provided on the transformer 23 one end of the further secondary winding being earthed and the other being connected to an output terminal 31.

Referring to Fig. 2($a$) a broken line 16 indicates the value of negative voltage between the control grid and cathode at which anode current just ceases to flow. On the application of the first pulse to the terminal 10 of Fig. 3 after the blocking-oscillator is switched on a pulse of current flows in the valve 22 and as a result of grid current flowing in the control grid circuit the capacitor 25 becomes charged with its upper plate in the drawing negative. The potential between the control grid and cathode of the valve 22 is then of a negative value equal to that illustrated by the broken line 17' in Fig. 2($a$).

The amplitude of the pulses applied to the terminal 10 of Fig. 3 is illustrated by the short vertical lines 17 in Fig. 2($a$) and the discharge of the capacitor 25 of Fig. 3 is illustrated by the exponential curve 15 in Fig. 2 ($a$) on which the pulses 17 are superimposed.

The amplitude of the pulses 17 is of a predetermined value such that during the exponential rise of the control grid-cathode potential the next succeeding nine pulses ($n-1=9$ in this embodiment) fail to carry the control grid-cathode potential above the level 16 at which anode current again flows in the valve 22 of Fig. 3. The 10th pulse shown at 18 causes a further pulse of anode current and the foregoing cycle of operation is repeated.

Referring again to Fig. 4, the output of the pulse generator 32 is applied to a control circuit 33 in addition to the frequency-divider 34. The control circuit is adapted to select a pulse from the output of the pulse generator and to apply the selected pulse after amplification to a second input terminal 14 of the frequency divider. The control circuit may be of any suitable kind for selecting a pulse from the output of the generator 32 and may, for example, take the form of the speech pulse allotter described in the specification of the aforesaid patent application.

Referring to Fig. 2(*b*), the pulse applied to the input terminal 14 of Fig. 4 is shown by a vertical line 21. It will be seen that the amplitude of the pulse 21 is sufficient to carry the control grid-cathode potential above the level 16 and hence to initiate a fresh cycle of operation of the frequency divider irrespective of the instant of occurrence of the pulse 21. In Fig. 2 following the commencement of a cycle at $t_1$ two pulses 19 and 20 occur at the terminal 10 of Fig. 3 before the control pulse 21 at the instant $t_2$. Thus the phase of the output pulses which coincide with the pulses 18 is shifted by 108° in Fig. 2(*b*) relatively to Fig. 2(*a*) on the basis that a complete cycle of 10 applied pulses equals 360°.

Where one blocking-oscillator is incapable of providing the division ratio required two or more may be connected in cascade as shown at 11 and 12 in Fig. 1, the phase-control pulse being applied from the terminal to the two or more frequency-dividers simultaneously.

Thus if the pulses applied at the terminal 10 are of a frequency $nf$ and the division ratios of the two frequency dividers 11 and 12 are $n$:1 and $m$:1 respectively, the frequency of the output at the terminal 13 is $f/m$ and can be set by the control circuit to any of $mn$ phases. If $f$=80,000 P. P. S. $n$=10 and $m$=10 the frequency of the pulses appearing at the output terminal is 8,000 P. P. S. whose phase can be shifted to any of 100 different positions.

It will be appreciated that although an arrangement has been described using blocking oscillators for frequency dividers other forms of frequency dividers may be suitable. For example a mono-stable multi-vibrator may be used.

It will also be appreciated that the input and output terminals of the blocking oscillator shown in Fig. 3 may be connected into the circuit at points other than those shown.

For example an arrangement as shown in Fig. 5 may be used. In Fig. 5 two blocking oscillators shown with broken lines 11 and 12 respectively correspond to the frequency dividers 11 and 12 of Fig. 1. The blocking oscillator 11 comprises a triode valve 35 having a transformer 36 connected in its anode lead, the transformer having three secondary windings 37, 38 and 39. The secondary winding 37 is shunted by a resistor and has one end connected to earth. The other end is connected through a rectifier 41 to the input terminal 10 and through a further rectifier 42 to the input terminal 14.

The winding 38 constitutes a neutralism winding and has one end connected to earth through a capacitor 43. The other end of the winding 38 is connected through the winding 39 to the control grid of the valve 35 and the junction of the two windings 38 and 39 is connected through resistors 44 and 45 in series to the positive terminal HT+ of the source of anode current for the valves, the resistor 44 being variable to enable the division ratio of the divider to be adjusted. The junction of the windings 38 and 39 is also connected to earth through a capacitor 46 which is shunted by a rectifier 47 and bias source 48 connected in series with one another.

The output of the blocking oscillator 11 appears across a load resistor 49 in the cathode lead of the valve 35.

The circuit of the blocking oscillator 12 is identical with that of the blocking oscillator 11 and corresponding components in the oscillator 12 are given the same reference with the superscript 1. The blocking oscillator 12 is arranged to have a recovery time ten times the recovery time of the blocking oscillator 11 since the frequency of the pulses appearing at the cathode of the valve 35 and applied through the rectifier 41′ to the blocking oscillator 12 are at one tenth of the frequency of the pulses applied to the terminal 10 and the blocking oscillator 12 is required to provide a division ratio of 10:1.

I claim:

1. An electric pulse generator suitable for generating regularly-recurring pulses of a frequency $f$ and of any one of $n$ different phases where $n$ is an integer greater than unity, the pulse generator including a frequency-divider of division ratio $n$:1, a source of regularly-recurring, operating pulses of predetermined amplitude and of a frequency $nf$ connected to the frequency divider, the frequency-divider comprising an electron discharge valve having a feedback circuit between its anode and control grid responsive to an operating pulse from the said source to initiate a cycle of operation which renders the valve unresponsive to the next succeeding $n$–1 operating pulses of the said predetermined amplitude, and a phase-control circuit connected to the frequency-divider, the phase-control circuit being operable to apply to the frequency-divider a pulse coincident with any one of the pulses generated by the said source at an amplitude larger than the said predetermined amplitude and sufficient to initiate a fresh one of the said cycles of operation.

2. An electric pulse generator according to claim 1, wherein the frequency-divider is in the form of a blocking-oscillator and the feedback circuit comprises a transformer having a primary winding connected in the anode circuit of the valve and a secondary winding connected between the control grid and cathode of the valve through a capacitor shunted by a resistor, the time constant of discharge of the capacitor determining the duration of each of said cycles of operation.

3. An electric pulse generator according to claim 1, and comprising a further frequency divider connected in cascade with the first said frequency divider and means for applying the control pulse to the two frequency dividers simultaneously.

References Cited in the file of this patent

UNITED STATES PATENTS

| | | |
|---|---|---|
| 2,585,722 | Baird | Feb. 12, 1952 |
| 2,676,251 | Scarbrough | Apr. 20, 1954 |